United States Patent [19]
Rossi
[11] Patent Number: 4,900,213
[45] Date of Patent: Feb. 13, 1990

[54] CENTRIFUGAL MACHINE FOR DISCHARGING VISCOUS PRODUCTS FROM CYLINDRICAL CONTAINERS

[75] Inventor: Amadeo A. Rossi, Mendoza, Argentina

[73] Assignee: Industrias Arquimides Rossi S.A., San Jose, Argentina

[21] Appl. No.: 284,406

[22] Filed: Dec. 14, 1988

[51] Int. Cl.[4] .............................. B65G 65/00
[52] U.S. Cl. .............................. 414/416; 414/403; 222/168; 222/169
[58] Field of Search .............................. 414/416, 417, 403; 222/460, 411, 410, 273; 494/43, 67

[56] References Cited

U.S. PATENT DOCUMENTS 2,199,848 5/1940 Bryson .............................. 494/43 X
3,365,128 6/1968 Townsend .............................. 494/43

FOREIGN PATENT DOCUMENTS 0730619 4/1980 U.S.S.R. .............................. 222/410
1132984 1/1985 U.S.S.R. .............................. 494/85

*Primary Examiner*—Robert J. Spar
*Assistant Examiner*—K. Dixon
*Attorney, Agent, or Firm*—Wells & White

[57] ABSTRACT

Centrifugal machine for discharging cylindrical containers having adhered viscous products, wherein said products are juice or pulp wastes of vegetables, fruits and the like, which remain adhered on the inner surfaces of generally cylindrical containers having a capacity of about two hundred liters, said machine comprising an auto-balancing support structure supporting a large inverted frusto-conical structure, the largest open base of which extends upwardly forming a converging annular flange towards which products from said containers are driven by centrifugal force, said containers being subjected to a high speed rotation by a rotary structure fixed about a central axle and having at least two radial formations for supporting removable containers with their longitudinal axes radially oriented in a balanced and horizontal manner, with their access covers open located distantly from the axle which is coaxial to the bin, the axle being connected to a radial exhausting turbine located beneath said bin and to a rotation transmission system coupled to an electrical engine joined rigidly to the cited structure.

3 Claims, 2 Drawing Sheets

CENTRIFUGAL MACHINE FOR DISCHARGING VISCOUS PRODUCTS FROM CYLINDRICAL CONTAINERS

BACKGROUND OF THE INVENTION

The instant invention mainly relates to a machine for centrifugally discharging viscous products contained into cylindrical containers, or the like, which products are generally adhered to the inner surfaces of said containers.

Specifically, the instant invention refers to a discharging machine specially designed to be used in industrial facilities devoted to foodstuff processing, such as pulp and juice of fruits, vegetables, etc., wherein such foodstuffs should be stored,generally transitorily, into variable capacity containers or drums, this capacity being sometimes higher than two hundred liters, in order to carry out various types of treatments, such as addition of other substances, controlled heating or cooling, etc.

In fact, since food products are perishable products which are transitorily stored into the mentioned containers, complete and perfect cleaning of the interior of said containers is mandatory before re-use thereof, thus avoiding pollution or other harmful effects originated by the wastes of substances which usually remain adhered after unappropriate washings.

PRIOR ART

It is known that, after conventional washing operations, wastes of the cited products remain adhered to the inner surfaces of said containers, as well as after complete withdrawal or consumption of the contents under normal conditions. Tilting and direct pumping suction, even very strong, are not enough for a suitable discharge of said containers; therefore, up to date, the only alternative to solve this problem is to dilute the mentioned products, usually with water, thus obtaining a rather acceptable result.

Inventors herein consider that, through a proper exploitation of the centrifugal force power, a wholly efficient centrifugal machine could be made for completely discharging the cited containers, thus leaving the inner surfaces thereof without any trace of particles of the products previously contained.

On the basis of such operating principle, the inventors developed, without the intended success, a centrifugal discharging machine, in an effort to solve the problem created by the high force required for a proper discharge, causing cracks and important breakages to the structures and basic parts of the machine. Therefore, this prior idea was abandoned and the invention was not worked, divulged or published.

SUMMARY OF THE INVENTION

The centrifugal discharging machine of the instant invention represents an acceptable and satisfactory solution to all the mentioned problems since it is based on subjecting the cylindrical containers, with their horizontal axes in radial directions, to high rotation at speeds being preferably regulatable up to a high number of revolutions per minute. The centrifugal force thus obtained is so powerful that, during rotation, all kind of particles crusted and adhered to the inner walls of said containers, are quickly separated, and the same centrifugal force immediately displaces said substances to the exhausting means provided, to which end containers should be placed on the machine without their covers at their circular planar face outwardly positioned Since loosening of adhered remaining particules is not immediate, but progressive, vibrations or the like take place unavoidably, since sometimes different accumulated materials are transitorily retained, which are more resistant to separation than others are, thus creating light mass unbalances resulting in said vibrations upon rotation.

Vibration forces are so intense that the invention includes resources for counteracting their effects; therefore, static parts of the machine should be rigidly mounted between each other, so that no relative movement is produced therebetween, and, likewise, all rotary parts should be rigidly interconnected, except the driving electrical engine. In this way, no cracks or breakages due to vibration occur in the rotary structure or in the support static structure.

Another feature of the machine of the invention is that, in order to collect and exhaust product particles centrifugally separated from the containers, the machine includes symmetrical and balanced means comprising: an inverted frusto-conical bin having at its larger and upper base a flange converging upwards to surround a circumferential upper opening of a diameter smaller than that of said bin; while at the smaller or bottom base such bin is completely open and directly communicated to an exhausting centrifugal turbine coaxial to said bin and extending up to its upper portion where in the same axle is rigidly joined to a rotary support comprising at least two radial and rigid formations supporting the cylindrical removable containers with their longitudinal axes being located radially and horizontally; with the provision that said radial formations should form such angles therebetween that they be mutually balanced: i.e., if there are two radial formations, then longitudinal axes should be at 180°. If they are three, at 120° if they are four at 90°, and so on; taking into account that it would not be practical to have more than four containers for discharging on a single machine.

In case more than four containers were to be discharged, it would be convenient to use more than one machine Under the turbine, the central rotary axle is rigidly connected, in turn, to a transmission crown associated to an electrical engine the housing of which is, in turn, rigidly joined to the structure supporting the machine, thus avoiding the metioned relative movements.

Said bin, along with the turbine housing and the electric engine housing, are supported by a hanging structure having its total weight supported by three vertical turnbuckles independently hanging from respective supports, so that a tilting supporting assembly is formed permitting accomodation in case of unbalance. The same hanging structure also supports, by means of bearings, such as a push bearing and combined bearings, the rotary vertical axle and the support for the containers to be emptied, so that possible vibrations in said support are transmitted to said structure and absorbed by the hanging turnbuckles.

Test results showed that, for the first time, advantage has been taken from the centrifugal force in order to perfectly discharge viscous wastes from cylindrical containers.

BRIEF DESCRIPTION OF THE DRAWINGS

In order to explain the above-mentioned advantages in more detail, the invention will be now described in connection with a non-limitative preferred embodiment thereof, taken along with the accompanying drawings, in which.

In all figures, the same reference numerals designate equal or equivalent parts or constituting elements of the particular embodiments of the instant invention.

DETAILED DESCRIPTION OF THE INVENTION

Figure 9:
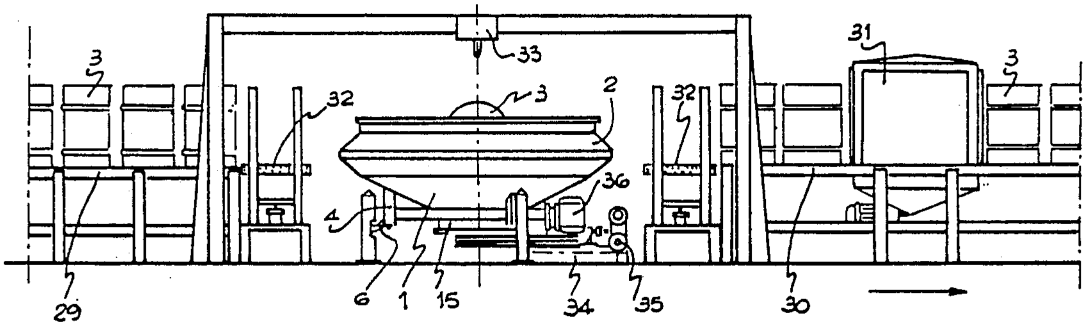
FIG. 9 is a side elevation of an equipment in which machines of the invention have been included for discharging two containers each time, complemented by conventional conveying and loading means; and, FIG. 10 is a plan view of another equipment including two machines of the previous figure.
Figure 10:
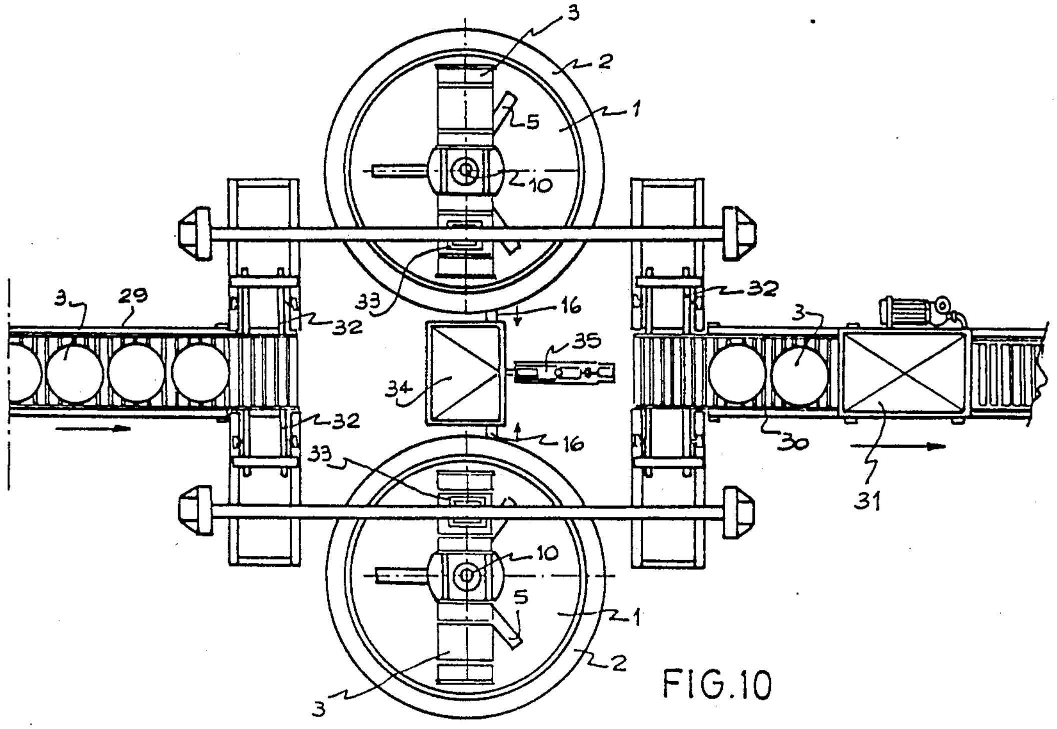

As may be seen in the drawings, the centrifugal machines of the invention comprise an inverted frustoconical bin 1 projecting at the top forming a flange 2 converging upwardly and housing a rotary support radially supporting three containers 3 which, in FIGS. 9 and 10, are two in accordance with an alternative embodiment of the invention.

Figure 7:
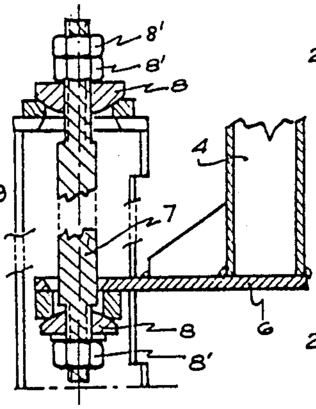
FIG. 7 is partial detail of the hanging structure against balance losses.

Said bin 1 is supported by a resistant structure which, in these embodiments, is comprised by three vertical supports, or right feet 4 rigidly connected to radial beams 6 partially located into said bin and forming, in this case, angles of 120° to obtain an even distribution of weights; said right feet being supported on respective arms 6 which in turn are held by hanging turnbuckles 7 clearly shown in figure 7, in which convex washers 8 may be seen at upper and lower ends, as swivelling accomodation members in case of eventual unbalance. Said washers 8 also serve for regulating the length through nuts 8'.

Figure 1:
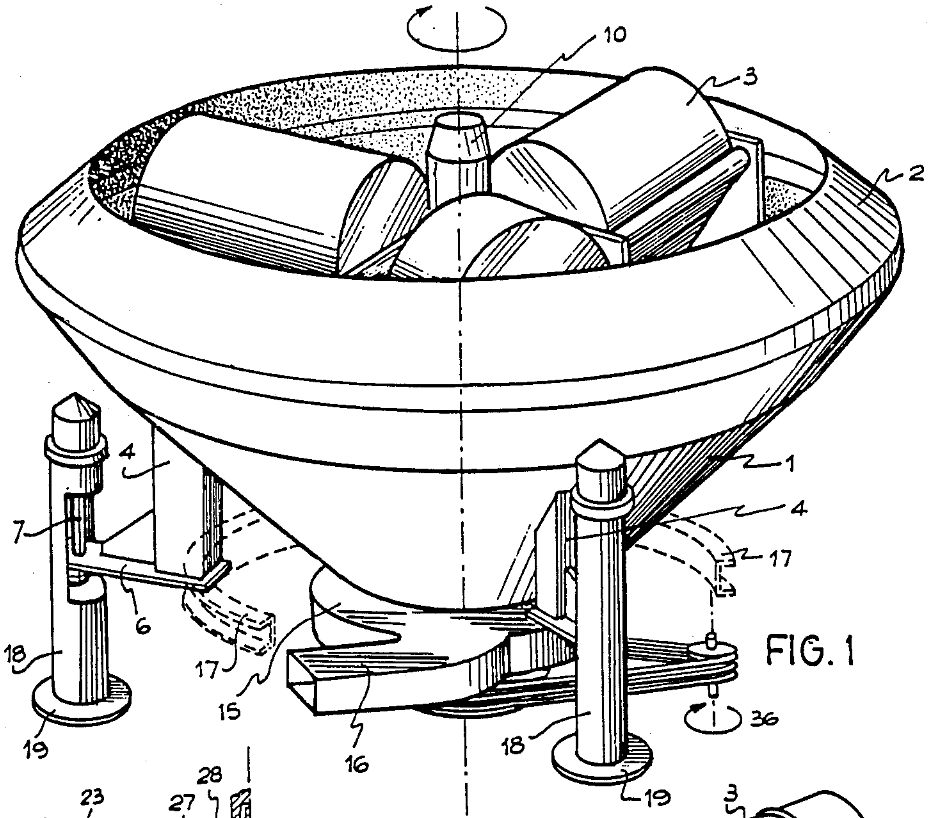
FIG. 1 is a perspective view of a centrifugal machine for discharging viscous products from containers, in accordance with the invention.
Figure 2:
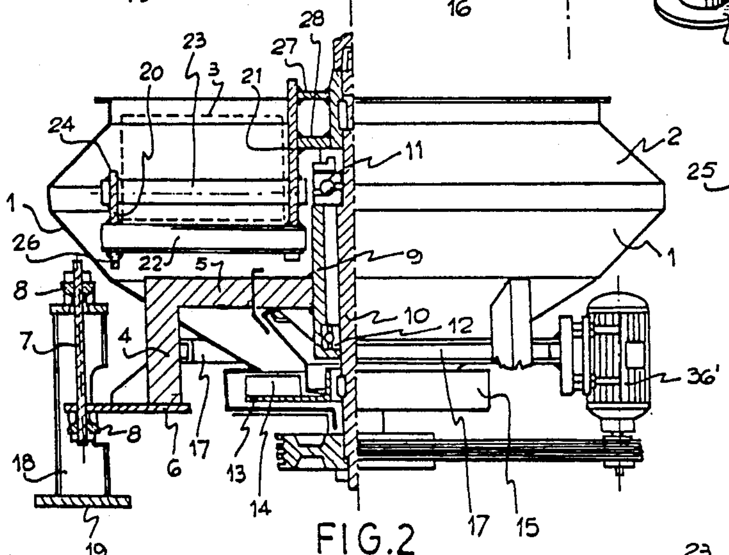
FIG. 2 is an elevation showing a vertical and radial section of the machine of FIG. 1.
Figure 6:
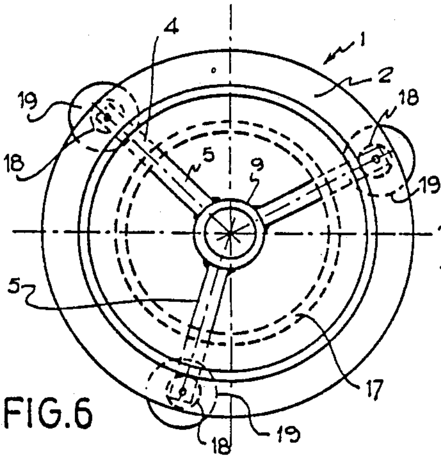
FIG. 6 is a plan view, from the top, of the bin and the main support structure of the same machine, the parts under such bin being indicated in phantom.

In FIGS. 2 and 6, it may be seen that radial beams 5 are rigidly connected to a resistant, hollow and coaxial cylinder 9 connected to the vertical, central and rotary AXLE 10 by means of an upper push bearing 11 and a lower bearing 12, or vice-versa. It may also be seen that the same hanging turnbuckle 7 supporting the bin weight, also supports said cylinder 9 and other elements of the machine.

Said ROTARY central axle 10 is also rigidly attached to a circular disc 13 supporting a plurality of blades 14 constituting a turbine 15 having a conventional tangential outlet 16 for exhausting the wastes of the viscous products separated from the containers 3 by the action of the centrifugal force obtained by an electrical engine supported by a rigid ring 17 which, in turn, is rigidly attached to the remaining parts of the fixed structure hanging from said turnbuckles. Said vertical turnbuckles 7 hang within columns 18 which, in turn, bears through bases 19 or the like on the floor.

Figure 3:
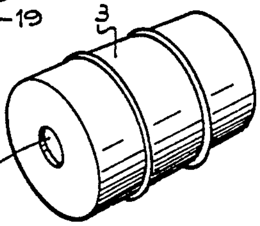
FIG. 3 is a perspective of one of the containers discharged by the machine of the invention and without its cover.
Figure 4:
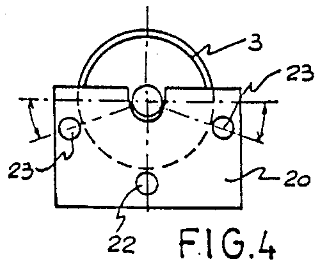
FIG. 4 is a front view of one of the machine supports, including the corresponding container at a discharging position.
Figure 5:
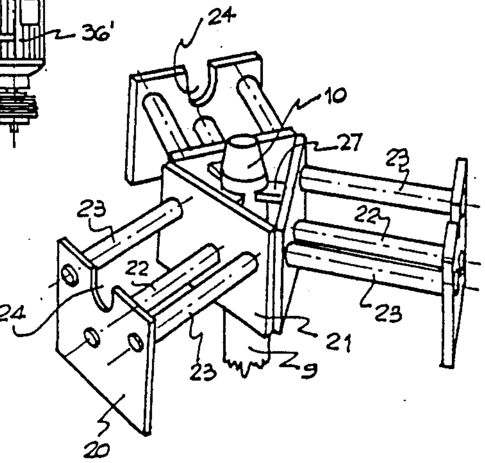
FIG. 5 is a perspective of the rotary assembly with three supports for containers, included in the machine of FIGS. 1 and 2.
Figure 8:
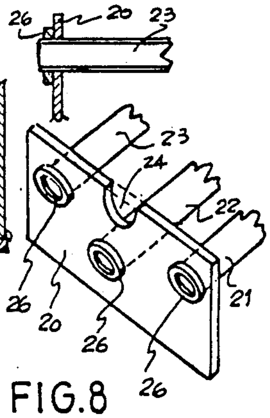
FIG. 8 shows a preferred resource for the resistant fixing of side and bottom support tubes for containers to be discharged by the machine.

At the larger portion of the bin 1 cavity, the support for containers 3 is rotatable, as shown in figure 5, said support being comprised by two, three or more radial formations for supporting respective cylindrical containers, each formation being comprised by two thick planar, vertical and parallel plates 20 and 21 rigidly connected by strong parallel tubes, one lower tube 22 and two side tubes 23, the front plate 20 having, optionally, a wide upper notch or opening 24 for the free exhausting of the wastes removed by centrifugation through the outlet 25 of each container 3, as may be seen in FIG. 3. An appropriate resource against the power of the centrifugal force is to engage plates 20, 21 to parallel tubes by means of the threaded rings shown in FIG. 8 with reference numeral 26.

The mentioned radial formations supporting containers are rigidly joined to the rotatable axle 10 by short resistant arms shown in FIGS. 2 and 5 and designated with reference numerals 27 and 28, by means of which inner plates 21 are held and fixed.

In FIGS. 9 and 10, the centrifugal machines shown are for supporting two containers 3 each, and include inlet and outlet lines, 29 and 30, with conventional horizontal conveyors, having a washing equipment 31 including pressurized water ejectors of the known type. In turn, the equipment shown includes means 32 for horizontally placing the containers 3 and for conveying them from or to the centrifugal machines by means of hanging conveyors 33 or the like. Also in FIGS. 9 and 10, the addition of a collector 34 for the separated products and an exhaust pump are shown.

From the assemblies of FIGS. 9 and 10, only the rotary discharging machines are within the scope of the invention.

When making the discharging centrifugal machine of the invention, modifications and/or improvements may be introduced, all of which should be considered as comprised within the scope of the instant invention, which is only limited by the spirit of the appended claims.

I claim:

1. Centrifugal machine for discharging viscous products from containers, wherein said products are wastes from juices or pulps of vegetables, fruits or the like, which remain adhered to the inner surfaces of generally cylindrical containers having variable capacity ; said machine being comprised by a hanging structure supporting a large inverted bin rigidly connected thereto and having a vertical axis, in the interior of which a coaxial axle rotates coupled to an electrical engine the housing of which is rigidly joined to the same structure; said axle being mounted through bearing means preventing relative displacements, except rotations, with respect to said structure, said axle being rigidly connected to a rotary support having at least two supporting formations for respective containers arranged with their longitudinal axes at radial, horizontal positions, and oriented for balancing their weights, having their access openings without the cover and oriented outwardly, such as to drive by centrifugal force the separated products towards the higher diameter edge of the bin, from which a frusto-conical flange projects upwardly and inwardly which also receives the exhausted products, all of which slide through the cited bin downwardly up to a final exhaust centrifugal turbine.

2. Centrifugal discharging machine as claimed in claim 1 wherein the hanging structure hangs from three vertical resistant turnbuckles, which are swivelling and have regulatable length, engaged to fixed points separated from the floor, housed at the interior of hollow columns bearing on said floor and equidistant from the axis of the bin, in accordance with radial positions forming therebetween angles of 120°.

3. Centrifugal discharging machine as claimed in claim 2, wherein each vertical turn-buckle is a rigid bar connected at the top to each fixed point and at the bottom to a radial arm of the hanging structure, having convex washers supported on concave washers which, in turn, are fixed by nuts threaded at both ends.

* * * * *